United States Patent
Tiwari et al.

(10) Patent No.: US 12,541,465 B2
(45) Date of Patent: Feb. 3, 2026

(54) BUFFER EXPANSION FOR RANDOM WRITE OPERATIONS

(71) Applicant: Micron Technology, Inc., Boise, ID (US)

(72) Inventors: Ritesh Tiwari, Karnataka (IN); Sridhar Prudviraj Gunda, Karnataka (IN); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/431,544

(22) Filed: Feb. 2, 2024

(65) Prior Publication Data

US 2024/0281383 A1   Aug. 22, 2024

Related U.S. Application Data

(60) Provisional application No. 63/446,085, filed on Feb. 16, 2023.

(51) Int. Cl.
  *G06F 12/10*   (2016.01)
  *G06F 12/0873*   (2016.01)
  *G06F 12/1027*   (2016.01)

(52) U.S. Cl.
  CPC ...... *G06F 12/1027* (2013.01); *G06F 12/0873* (2013.01)

(58) Field of Classification Search
  CPC .. G06F 12/10; G06F 12/1027; G06F 12/0873; G06F 12/08
  See application file for complete search history.

(56) References Cited

U.S. PATENT DOCUMENTS

| | | | |
|---|---|---|---|
| 11,734,167 B2 * | 8/2023 | Kim | G06F 12/063 711/154 |
| 12,111,769 B2 * | 10/2024 | Wang | G06F 12/0873 |
| 2014/0082323 A1 * | 3/2014 | Li | G06F 12/0246 711/207 |
| 2020/0242021 A1 * | 7/2020 | Gholamipour | G06F 11/1456 |
| 2020/0310677 A1 * | 10/2020 | Byun | G06F 3/0656 |

(Continued)

OTHER PUBLICATIONS

K. Han, H. Kim and D. Shin, "WAL-SSD: Address Remapping-Based Write-Ahead-Logging Solid-State Disks," in IEEE Transactions on Computers, vol. 69, No. 2, pp. 260-273, Feb. 1, 2020.*

(Continued)

*Primary Examiner* — Pierre Michel Bataille
(74) *Attorney, Agent, or Firm* — Holland & Hart LLP (57) ABSTRACT

Methods, systems, and devices for buffer expansion for random write operations are described. Implementations provide buffer expansion for random write operations used to store L2P address translation table data under certain recognized operation workloads. Memory locations within the memory system controller are typically allocated for use during various operations. During different operational workloads, the amount of memory required for each of these different allocated memory areas may vary. By recognizing the entry of the memory system into a workload of random write operations, the memory system controller may expand a buffer size used to store the portion of the L2P address translation table data used during the write operations to retain larger portions of the L2P address translation table in the buffer.

18 Claims, 5 Drawing Sheets

(56) References Cited

U.S. PATENT DOCUMENTS

| | | | |
|---|---|---|---|
| 2022/0197862 A1* | 6/2022 | Yang | G06F 12/0253 |
| 2022/0206713 A1* | 6/2022 | Kim | G06F 3/0656 |
| 2023/0138215 A1* | 5/2023 | Hiwada | G06F 12/0246 |
| | | | 711/103 |
| 2023/0143926 A1* | 5/2023 | Inbar | G06F 3/0644 |
| | | | 711/154 |
| 2023/0195646 A1* | 6/2023 | Liu | G06F 12/1009 |
| | | | 711/206 |
| 2023/0350808 A1* | 11/2023 | Wang | G06F 12/10 |
| 2024/0193095 A1* | 6/2024 | Xu | G06F 12/1054 |
| 2024/0201860 A1* | 6/2024 | Wu | G06F 3/0679 |
| 2024/0232082 A1* | 7/2024 | Lee | G06F 12/0875 |

OTHER PUBLICATIONS

M. Yui, J. Miyazaki, S. Uemura and H. Yamana, "Nb-GCLOCK: A non-blocking buffer management based on the generalized CLOCK," 2010 IEEE 26th International Conference on Data Engineering (ICDE 2010), Long Beach, CA, USA, 2010, pp. 745-756.*

A. S. Ramasamy and P. Karantharaj, "RFFE: A Buffer Cache Management Algorithm for Flash-Memory-Based SSD to Improve Write Performance," in Canadian Journal of Electrical and Computer Engineering, vol. 38, No. 3, pp. 219-231, Summer 2015.*

* cited by examiner

BUFFER EXPANSION FOR RANDOM WRITE OPERATIONS

CROSS REFERENCE

The present Application for Patent claims the benefit of U.S. Provisional Patent Application No. 63/446,085 by TIWARI et al., entitled "BUFFER EXPANSION FOR RANDOM WRITE OPERATIONS," filed Feb. 16, 2023, assigned to the assignee hereof, and expressly incorporated by reference in its entirety herein.

TECHNICAL FIELD

The following relates to one or more systems for memory, including buffer expansion for random write operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Non-volatile memory devices, such as NAND memory devices, may utilize a mapping of logical addresses used in read and write commands (e.g., received from a host system) to physical addresses of a memory device. The mapping contained within a logical-to-physical (L2P) address translation table data may be periodically updated when write operations are performed on the memory device. Maintaining the L2P address translation table may utilize a relatively large quantity of volatile memory within the device. Due to the size of the L2P table, the entire table may not be stored to the volatile memory. As such, the memory system controller may need to maintain a portion of the L2P address translation table within the memory devices (e.g., within the non-volatile memory), and may periodically load new portions of the L2P address translation table to the volatile memory (e.g., from the non-volatile memory).

The loading and off-loading of the L2P address translation table data may add overhead that may affect the performance of host read and write operations. The size of the volatile memory used to hold the portion of the L2P address translation table data may affect the frequency at which the L2P address translation table within the memory devices is updated. Adjusting the size of the volatile memory based upon a type of read and write operation workload being performed by the memory system controller may increase the overall performance of the memory system as viewed by the operations performed in response to host read and write operations.

A memory system may utilize a buffer (e.g., volatile memory) to store portions of a L2P address translation table. When data is written into the non-volatile devices (e.g., when a write command is received), the logical address associated with the write command may be mapped to a physical address of the non-volatile device, and the mapping between the addresses may be recorded (e.g., stored) to the buffer. The complete L2P address translation table may be larger than the size of the volatile memory. As such, portions of the L2P address translation table may be stored in available memory in the buffer and new L2P address translation mappings may be entered into a change log that includes change-log entries. The buffer may be updated based on the change-log entries, and the buffer may be flushed periodically to update the L2P address translation table (e.g., the full L2P table) stored to the non-volatile memory. The reading and writing of L2P address translation table data between the buffer and the non-volatile devices may conflict with performance of host write operations to be performed by the memory system controller, which may reduce the overall performance of the memory system.

Implementations described herein address the aforementioned shortcomings and other shortcomings by providing buffer expansion for random write operations used to store L2P address translation table data under certain recognized operation workloads. Memory locations within a volatile memory (e.g., within a buffer) may be allocated for use during various operations such as host read operations, host write operations, and garbage collection operations. During different operational workloads, the amount of memory required for each of these different allocated memory areas may vary. When a memory system enters a random write workload, the memory system controller may expand a buffer size used to store the portion of the L2P address translation table data used during the write operations to retain larger portions of the L2P address translation table. Expanding the size of the buffer may reduce the frequency at which the buffer is flushed and the full L2P table is updated, which may improve the overall performance of the memory system.

In addition to applicability in memory systems as described herein, techniques for buffer expansion for random write operations may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reducing the frequency at which the buffer is accessed and/or flushed and other information is updates, which may decrease processing or latency times, improve response times, or otherwise improve system operation, among other benefits.

Figure 1:
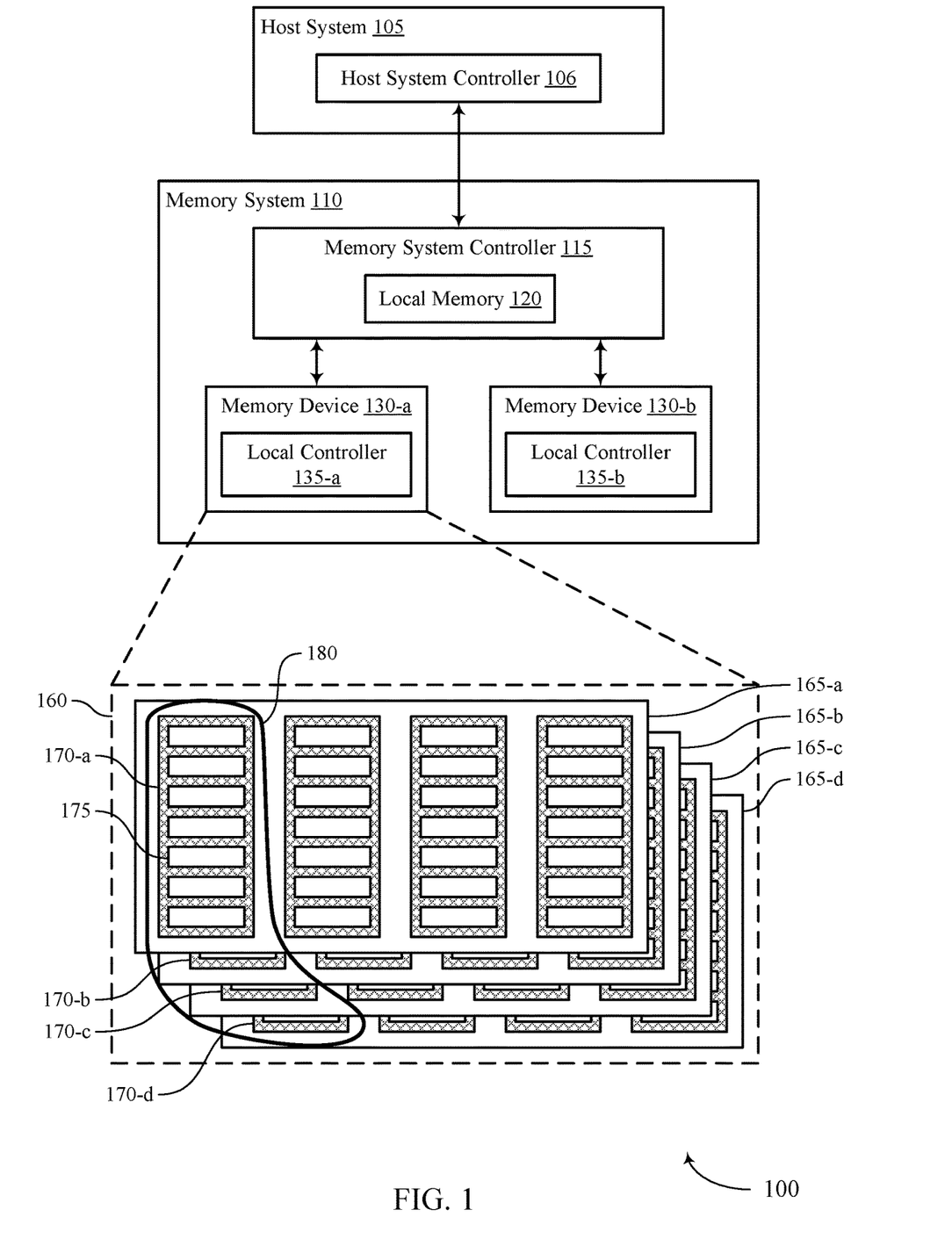
FIG. 1 illustrates an example of a system that supports buffer expansion for random write operations in accordance with examples as disclosed herein.
Figure 2:
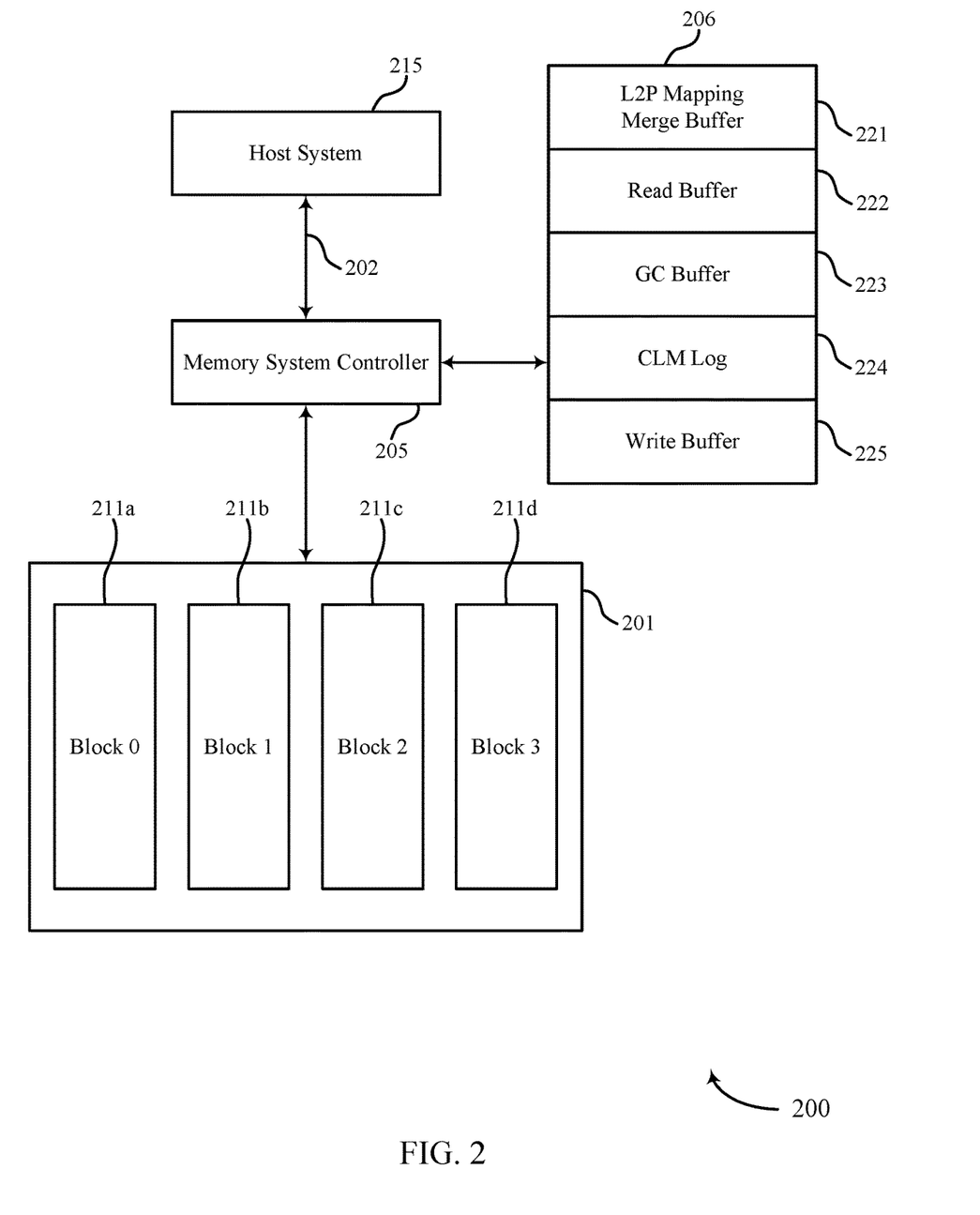
FIG. 2 illustrates an example system that supports buffer expansion for random write operations in accordance with examples as disclosed herein.

Features of the disclosure are initially described in the context of systems, devices, and circuits with reference to FIGS. 1 and 2. Features of the disclosure are described in the context of a process flow diagram with reference to FIG. 3. These and other features of the disclosure are further illustrated by and described in the context of an apparatus diagram and flowchart that relate to buffer expansion for random write operations with reference to FIGS. 4 and 5.

FIG. 1 illustrates an example of a system 100 that supports buffer expansion for random write operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support buffer expansion for random write operations. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may include a volatile memory (e.g., a local memory 120 or another volatile memory) and a change log. Memory locations within the volatile memory (e.g., within the buffer) may be allocated for use during various operations such as host system 105 read operations, host system 105 write operations, and garbage collection operations. During different operational workloads, the amount of memory required for each of these different allocated memory areas may vary. When the memory system 110 enters a random write workload, the memory system controller 115 may expand a buffer size used to store a portion of a L2P table used during the write operations to retain larger portions of the full L2P table stored to the memory device 130. Expanding the size of the buffer may reduce the frequency at which the buffer is flushed and the full L2P table is updated, which may improve the overall performance of the memory system 110.

FIG. 2 illustrates an example of a system 200 that supports buffer expansion for random write operations in accordance with examples as disclosed herein. System 200 may include a host system 215 coupled to a memory system controller 205 that receives commands 202 that include random write operation commands. The memory devices 201 may include one or more memory devices, each of which may contain a plurality of blocks 211a-211d of non-volatile memory cells used to store and retrieve data. The memory system controller 205 may be coupled with a volatile memory (e.g., SRAM 206) to maintain various data buffers used when performing host system operation commands. The data buffers in the SRAM 206 may include an L2P mapping merge buffer 221 that stores a portion of a L2P table, a read buffer 222, a garbage collection (GC) buffer 223, and a central log management (CLM) log 224. The SRAM 206 may also include different buffers that are not shown.

When data is written into the memory devices 201 (e.g., when a write command is received), the logical address used to store the written data may be mapped to a physical address within the non-volatile devices, and the mapping may be recorded (e.g., stored) to the portion of the L2P mapping merge buffer 221. The L2P mapping merge buffer 221 may be maintained within a region of SRAM 206 accessible by the memory system controller 205. The SRAM 206 may also maintain memory regions for other uses for the memory system controller 205, for example, the read buffer 222, the GC buffer 223, the CLM log 224, and the write buffer 225.

The complete L2P address translation table may be larger than an amount of memory available within the L2P mapping merge buffer 221. As such, portions of the L2P address translation table are stored in available memory in the SRAM 206. When a write command is received, an entry may be stored to the CLM log 224 and an entry in the L2P mapping merge buffer 221 may be periodically updated. The L2P mapping merge buffer 221 may be updated based on the change-log entries, and the L2P mapping merge buffer 221 may be flushed periodically to update the L2P address translation table. The reading and writing of L2P address translation table data between the L2P mapping merge buffer 221 and the memory devices 201 may conflict with performance of host write operations to be performed by the memory system controller 205, which may reduce the overall performance of the memory system.

The conflict between the reading and writing of L2P address translation table data between the L2P mapping merge buffer 221 and the memory devices 201 and the performance of host write operations may be reduced by expanding a size of the L2P merge buffer 221 during certain workloads. Memory locations within the SRAM 206 may be allocated for use during various operations such as host system 215 read operations, host system 215 write operations, and garbage collection operations. During different operational workloads, the amount of memory required for each of these different allocated memory areas may vary. By recognizing the entry of the memory system into a workload of random write operations, the memory system controller 205 may expand the size of the L2P mapping merge buffer 221, which may reduce the frequency at which portions of the full L2P table are loaded from and flushed to the memory devices 201.

In some examples, the memory system controller 205 may determine that the host system 215 has entered into a random write workflow based on detecting a quantity (e.g., a series) of random write operations. During occurrence of an extended random write operation command stream in which the host system 215 issues a series of random write operation commands, the memory system controller 205 allocate volatile memory cells (e.g., of the SRAM 206) to the L2P mapping merge buffer 221. The allocated volatile memory cells may have been previously allocated for use by the read buffer 222, the GC buffer 223, the write buffer 225, or a portion of one or more of the buffers. By expanding the size of the L2P mapping merge buffer 221, the L2P mapping merge buffer 221 may be able to store a larger portion of the entire L2P table stored to the memory device 201. Accordingly, the memory system controller 205 may load portions of the L2P table to the L2P mapping merge buffer 221 less frequently, and the L2P mapping merge buffer 221 may be flushed to the memory device 201 less frequently, which may improve the overall performance of the system 200.

The random write operation command stream may include a quantity of random write operations associated with a particular set of operations, and as such, the expanded size of the L2P mapping merge buffer 221 may be maintained (e.g., for a duration) so long as random write operations continue. After the duration (e.g., after the random write workflow ends), the allocated memory cells of the SRAM 206 may be allocated (e.g., reallocated) back to other buffers such as the read buffer 222, the GC buffer 223, or both.

In some examples, entries may be stored to the CLM log 224 until a threshold quantity of entries is satisfied. For example, when a certain quantity entries or a certain size of the entries written to the CLM log 224 satisfies a threshold (e.g., a first threshold), then the entries in the CLM log 224 may be effected at the L2P mapping merge buffer 221. For example, one or more entries may be updated at or added to the L2P mapping merge buffer 221 once the entries in the CLM log 224 satisfy the first threshold. Additionally or alternatively, when the entries in the CLM log 224 satisfy the first threshold, one or more entries may be updated at or added to the L2P table stored to the memory device 201. These entries may serve as a backup in the event of a power loss (e.g., an asynchronous power loss) or other event.

In some examples, the first threshold value may be satisfied when the CLM log 224 becomes full. When the CLM log 224 becomes full, the memory system controller 205 may processes the entries in the CLM log 224 to apply the L2P address mappings in these entries to the L2P mapping merge buffer 221 in the SRAM 206. The contents of the CLM log 224 may also be backed up into the memory devices 201 to maintain a log of L2P address mappings altered during the random write operation command stream. The back of a log of L2P address mappings may be required to restore the L2P mapping merge buffer 221 from a previously stored copy of the L2P address translation table maintained within the memory devices 201 upon occurrence of a forced-sync and/or power-down event by applying the address translation change entries in the log backup to the previously stored copy of the L2P address translation table retrieved from the memory devices 201. Once the CLM log 224 has been applied to the L2P mapping merge buffer 221 and a backup stored into the memory devices 201, the CLM log 224 may be reused to maintain additional L2P address mapping entries generated from additional random write operations.

In other examples, once a quantity of data written to the memory devices 201 satisfies a threshold (e.g., a second threshold), the contents of the L2P mapping merge buffer 221 may be flushed to the memory devices 201. Accordingly, the full L2P table may be updated based on the contents of the L2P mapping merge buffer. In other examples, the L2P mapping merge buffer 221 may be flushed periodically (e.g., at a predefined duration). By expanding the size of the L2P mapping merge buffer 221 during certain workflows (e.g., during random write workflows), the overall performance of the system 200 may be improved.

Figure 3:
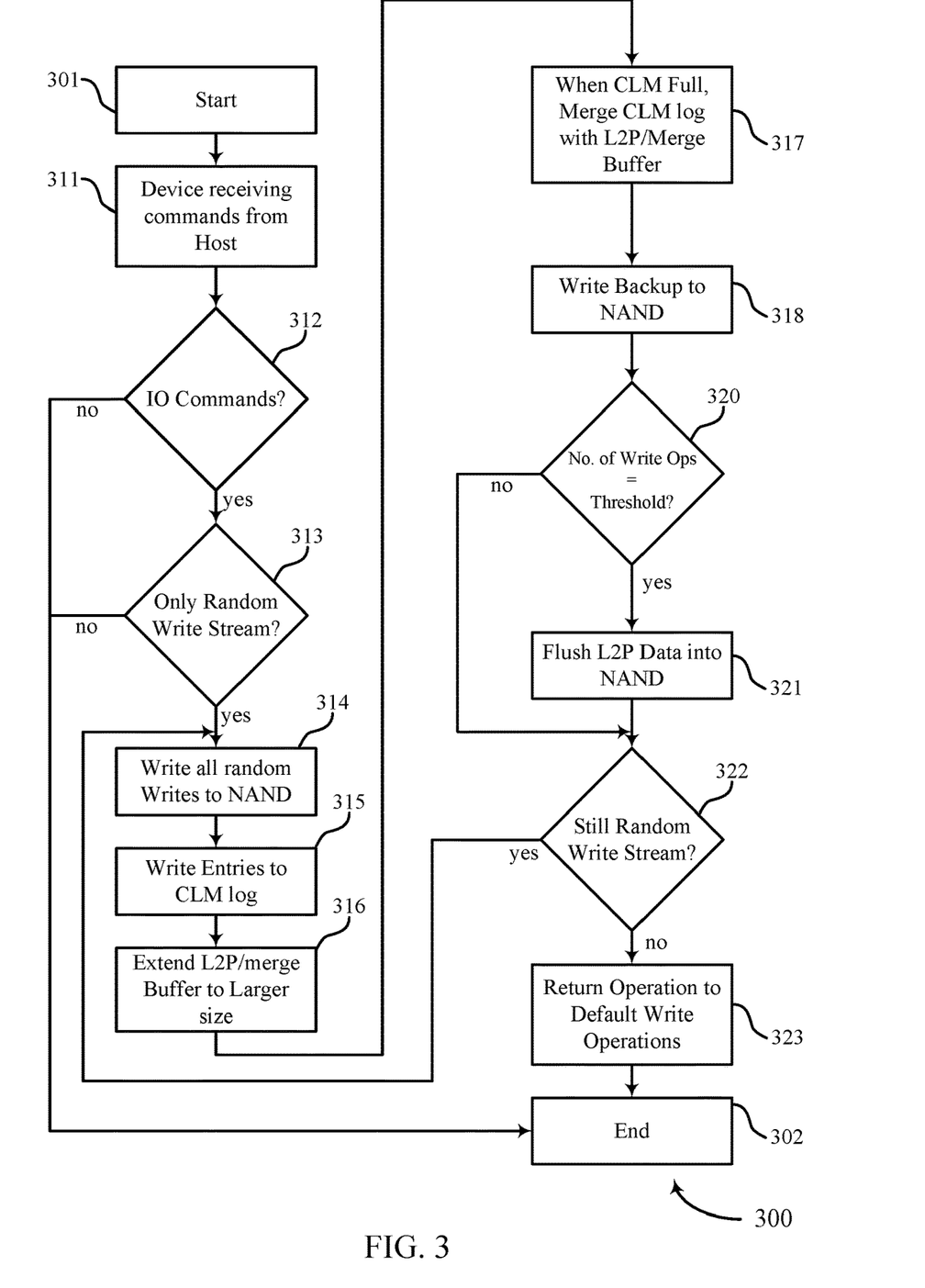
FIG. 3 illustrates an example of a process flow diagram that supports buffer expansion for random write operations in accordance with examples as disclosed herein.

FIG. 3 illustrates an example of a process flow diagram showing a process 300 that supports buffer expansion for random write operations in accordance with examples as disclosed herein. The operations of process 300 may be implemented by a memory system or its components as described herein. For example, the operations of process 300 may be performed by a memory system as described with reference to FIGS. 1 and 2. In some examples, a memory system may execute a set of instructions to control the functional elements of the device to perform the described functions. Additionally, or alternatively, the memory system may perform aspects of the described functions using special-purpose hardware. The process 300 may support the expansion of a buffer of the memory system, which may reduce the frequency at which the buffer is flushed and a full L2P table is updated, which may improve the overall performance of the associated memory system.

At 301, the process 300 may begin. At step 311, the memory system controller 205 may receive one or more commands from host system 215. At 312, the memory system controller 205 may determine whether the commands received from the host system 215 correspond to random write commands. If the commands do not correspond to random write commands, the process 300 may end at 312. If the commands correspond to random write commands, the process 300 may proceed to step 313. At 313, the memory system controller 205 may determine whether the commands received from the host system 215 correspond to only a random write command stream. If the commands do not correspond only to a random write stream, the process 300 may end at 313. If the commands correspond to only a random write stream, the process 300 may proceed to step 314.

At step 314, the memory system controller 205 may write data associated with the random write operations to the memory devices 201. At step 315, the memory system controller 205 may write one or more entries to the CLM log 224. The entries may include a mapping between logical block addresses and physical block addresses of data written to the memory devices 201. The entries may be written to the L2P mapping merge buffer 221. At step 316, a size of the L2P mapping merge buffer 221 may be expanded. In some examples, the L2P mapping merge buffer 221 may be expanded prior writing the one or more entries to the CLM log 224 (e.g., prior to step 315).

At step 317, the CLM log 224 may include a quantity of entries that satisfies a first threshold value. Additionally or alternatively, a size of the entries stored to the CLM log 224 may satisfy the first threshold value. Accordingly, the entries may be stored (e.g., written) to the L2P mapping merge buffer 221. At step 318, a copy of the entries stored to the CLM log 224 may also be written to the memory devices 201.

Figure 4:
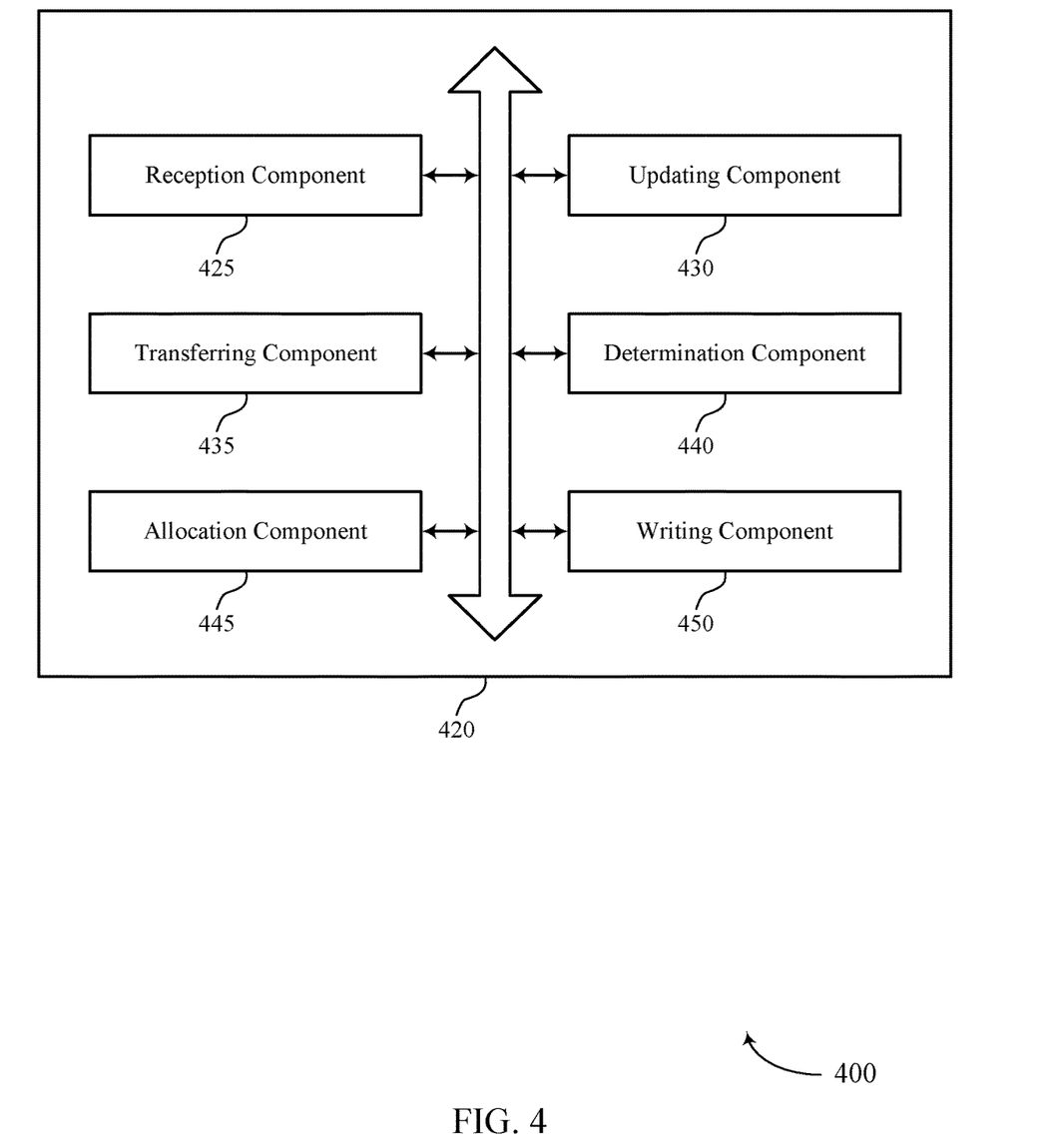
FIG. 4 illustrates a block diagram of a memory system that supports buffer expansion for random write operations in accordance with examples as disclosed herein.

At 320, the memory system controller 205 may determine whether a threshold quantity of data has been written to the memory devices 201. If the quantity of data does not satisfy a second threshold value, the process 300 may proceed to step 322. If the quantity of data satisfies the second threshold value (e.g., if the quantity of data written to the memory devices 201 during the random write operations is equal to or exceeds, for example, 1 GB), the process 300 may proceed to step 321. At step 321, the L2P mapping merge buffer 221 may be flushed to the memory devices 201. At step 322, the memory system controller 205 may determine whether the random write command stream is being received. If the random write stream is still being received, the process 300 may return to step 314 to continue processing commands from the host system 215. If the random write command is not being received, the process 300 may proceed to step 323. At step 323, the memory system controller 205 return to default write operations and may allocate (e.g., reallocate) one or more volatile memory cells to other buffers of the SRAM 206. The process 300 may end at 302. By expanding the size of the L2P mapping merge buffer 221 during certain workflows (e.g., during random write workflows), the overall performance of the system 200 may be improved FIG. 4 illustrates a block diagram 400 of a memory system 420 that supports buffer expansion for random write operations in accordance with examples as disclosed herein. The memory system 420 may be an example of aspects of a memory system as described with reference to FIGS. 1 through 3. The memory system 420, or various components thereof, may be an example of means for performing various aspects of buffer expansion for random write operations as described herein. For example, the memory system 420 may include a reception component 425, an updating component 430, a transferring component 435, a determination component 440, an allocation component 445, a writing component 450, or any combination thereof. Each of these components may communicate, directly or indirectly, with one another (e.g., via one or more buses).

The reception component 425 may be configured as or otherwise support a means for receiving a plurality of write commands that each include data and a logical address associated with a memory system including non-volatile memory cells. The updating component 430 may be configured as or otherwise support a means for updating a change-log of entries that include changes to mappings between the plurality of logical addresses and respective physical addresses of the non-volatile memory cells based at least in part on receiving the plurality of write commands. In some examples, the updating component 430 may be configured as or otherwise support a means for updating, at a buffer of the memory system, the mappings between the plurality of logical addresses and the respective physical addresses of the non-volatile memory cells based at least in part on a quantity of entries of the change-log satisfying a first threshold value. The transferring component 435 may be configured as or otherwise support a means for transferring the entries of the change-log to the non-volatile memory cells based at least in part on the quantity of entries of the change-log satisfying the first threshold value.

In some examples, the determination component 440 may be configured as or otherwise support a means for determining that the plurality of write commands include random write commands based at least in part on receiving the plurality of write commands. In some examples, the allocation component 445 may be configured as or otherwise support a means for allocating, for a duration, a first plurality of volatile memory cells for use by the buffer based at least in part on determining that the plurality of write commands include random write commands.

In some examples, the buffer includes a second plurality of volatile memory cells independent from the first plurality of volatile memory cells. In some examples, transferring the entries of the change-log to the non-volatile memory cells occurs during the duration.

In some examples, the allocation component 445 may be configured as or otherwise support a means for allocating, after the duration, the first plurality of volatile memory cells for use by a component of the memory system other than the buffer.

In some examples, the transferring component 435 may be configured as or otherwise support a means for transferring information stored in the buffer to the non-volatile memory cells based at least in part on a quantity of data written to the non-volatile memory cells satisfying a second threshold value.

In some examples, the determination component 440 may be configured as or otherwise support a means for determining that the quantity of data written to the non-volatile memory cells satisfies the second threshold value based at least in part on updating the mappings, where transferring the information stored in the buffer to the non-volatile memory cells is based at least in part on determining that the quantity of data written to the non-volatile memory cells satisfies the second threshold value.

In some examples, the determination component 440 may be configured as or otherwise support a means for determining that the quantity of entries in the change-log satisfies the first threshold value based at least in part on updating the change-log, where updating the mappings between the plurality of logical addresses and the respective physical addresses at the buffer and transferring the entries of the change-log to the non-volatile memory cells is based at least in part on determining that the quantity of entries in the change-log satisfies the first threshold value.

In some examples, the reception component 425 may be configured as or otherwise support a means for receiving a second plurality of write commands that each include second data and a second logical address based at least in part on updating the mappings between the plurality of logical addresses and the respective physical addresses of the non-volatile memory cells. In some examples, the updating component 430 may be configured as or otherwise support a means for updating the change-log of entries to mappings between the plurality of second logical addresses and respective physical addresses of the non-volatile memory cells based at least in part on receiving the second plurality of write commands. In some examples, the updating component 430 may be configured as or otherwise support a means for updating, at the buffer, the mappings between the plurality of second logical addresses and the respective physical addresses of the non-volatile memory cells based at least in part on the quantity of entries of the change-log satisfying the first threshold value for a second time, where the entries transmitted from the change-log to the non-volatile memory cells includes the mappings between the plurality of second logical addresses and the respective physical addresses of the non-volatile memory cells.

In some examples, the writing component 450 may be configured as or otherwise support a means for writing the plurality of data to the respective physical addresses of the non-volatile memory cells based at least in part on receiving the plurality of write commands, where updating the change-log of changes to the mappings between the plurality of logical addresses and the respective physical addresses of the non-volatile memory cells is based at least in part on writing the plurality of data to the respective physical addresses of the non-volatile memory cells.

In some examples, the buffer includes a mapping merge buffer.

Figure 5:
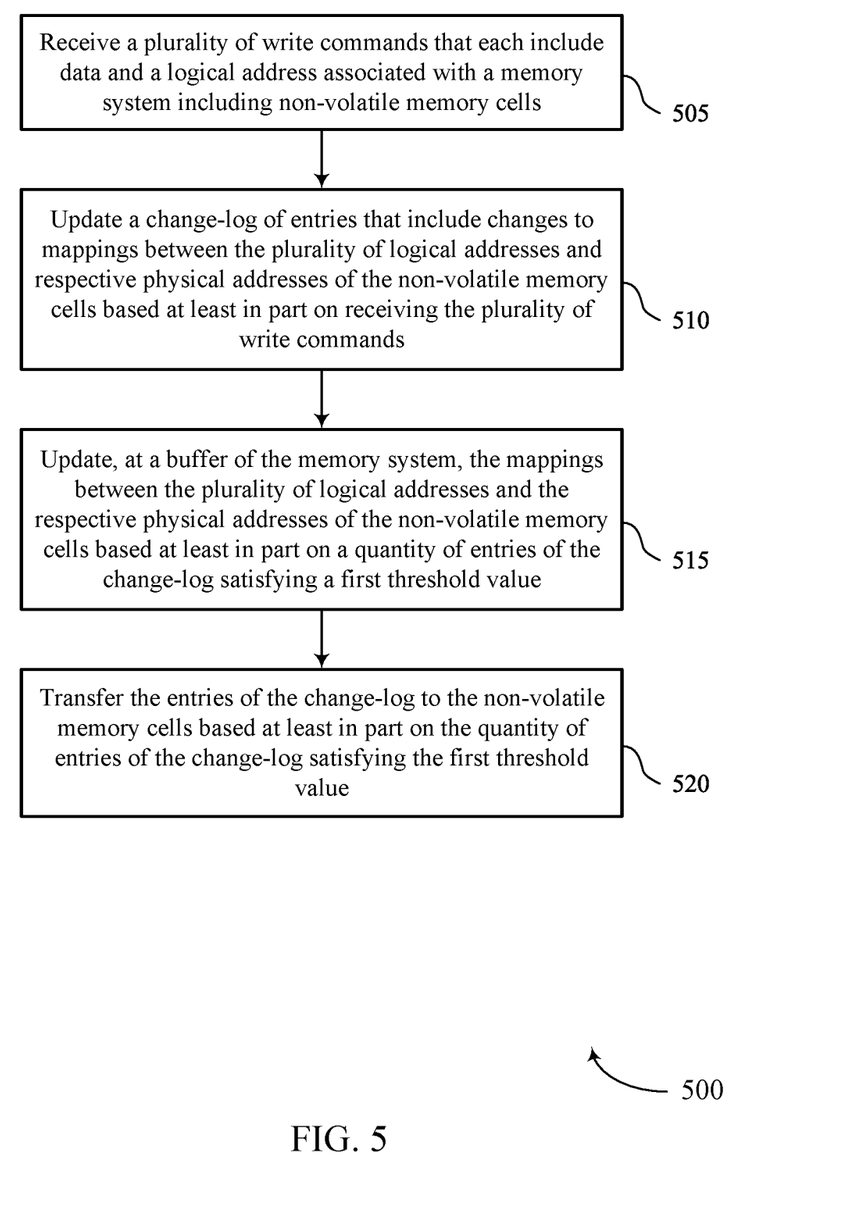
FIG. 5 illustrates a flowchart showing a method or methods that support buffer expansion for random write operations in accordance with examples as disclosed herein.

FIG. 5 illustrates a flowchart showing a method 500 that supports buffer expansion for random write operations in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a plurality of write commands that each include data and a logical address associated with a memory system including non-volatile memory cells. The operations of 505 may be performed in accordance with examples as disclosed herein. In some examples, aspects of the operations of 505 may be performed by a reception component 425 as described with reference to FIG. 4.

At 510, the method may include updating a change-log of entries that include changes to mappings between the plurality of logical addresses and respective physical addresses of the non-volatile memory cells based at least in part on receiving the plurality of write commands. The operations of 510 may be performed in accordance with examples as disclosed herein. In some examples, aspects of the operations of 510 may be performed by an updating component 430 as described with reference to FIG. 4.

At 515, the method may include updating, at a buffer of the memory system, the mappings between the plurality of logical addresses and the respective physical addresses of the non-volatile memory cells based at least in part on a quantity of entries of the change-log satisfying a first threshold value. The operations of 515 may be performed in accordance with examples as disclosed herein. In some examples, aspects of the operations of 515 may be performed by an updating component 430 as described with reference to FIG. 4.

At 520, the method may include transferring the entries of the change-log to the non-volatile memory cells based at least in part on the quantity of entries of the change-log satisfying the first threshold value. The operations of 520 may be performed in accordance with examples as disclosed herein. In some examples, aspects of the operations of 520 may be performed by a transferring component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a plurality of write commands that each include data and a logical address associated with a memory system including non-volatile memory cells; updating a change-log of entries that include changes to mappings between the plurality of logical addresses and respective physical addresses of the non-volatile memory cells based at least in part on receiving the plurality of write commands; updating, at a buffer of the memory system, the mappings between the plurality of logical addresses and the respective physical addresses of the non-volatile memory cells based at least in part on a quantity of entries of the change-log satisfying a first threshold value; and transferring the entries of the change-log to the non-volatile memory cells based at least in part on the quantity of entries of the change-log satisfying the first threshold value.

Aspect 2: The method, apparatus, or non-transitory computer-readable medium of aspect 1, further including operations, features, circuitry, logic, means, or instructions, or any combination thereof for determining that the plurality of write commands include random write commands based at least in part on receiving the plurality of write commands and allocating, for a duration, a first plurality of volatile memory cells for use by the buffer based at least in part on determining that the plurality of write commands include random write commands.

Aspect 3: The method, apparatus, or non-transitory computer-readable medium of aspect 2, where the buffer includes a second plurality of volatile memory cells independent from the first plurality of volatile memory cells and transferring the entries of the change-log to the non-volatile memory cells occurs during the duration.

Aspect 4: The method, apparatus, or non-transitory computer-readable medium of any of aspects 2 through 3, further including operations, features, circuitry, logic, means, or instructions, or any combination thereof for allocating, after the duration, the first plurality of volatile memory cells for use by a component of the memory system other than the buffer.

Aspect 5: The method, apparatus, or non-transitory computer-readable medium of any of aspects 1 through 4, further including operations, features, circuitry, logic, means, or instructions, or any combination thereof for transferring information stored in the buffer to the non-volatile memory cells based at least in part on a quantity of data written to the non-volatile memory cells satisfying a second threshold value.

Aspect 6: The method, apparatus, or non-transitory computer-readable medium of aspect 5, further including operations, features, circuitry, logic, means, or instructions, or any combination thereof for determining that the quantity of data written to the non-volatile memory cells satisfies the second threshold value based at least in part on updating the mappings, where transferring the information stored in the buffer to the non-volatile memory cells is based at least in part on determining that the quantity of data written to the non-volatile memory cells satisfies the second threshold value.

Aspect 7: The method, apparatus, or non-transitory computer-readable medium of any of aspects 1 through 6, further including operations, features, circuitry, logic, means, or instructions, or any combination thereof for determining that the quantity of entries in the change-log satisfies the first threshold value based at least in part on updating the change-log, where updating the mappings between the plurality of logical addresses and the respective physical addresses at the buffer and transferring the entries of the change-log to the non-volatile memory cells is based at least in part on determining that the quantity of entries in the change-log satisfies the first threshold value.

Aspect 8: The method, apparatus, or non-transitory computer-readable medium of any of aspects 1 through 7, further including operations, features, circuitry, logic, means, or instructions, or any combination thereof for receiving a second plurality of write commands that each include second data and a second logical address based at least in part on updating the mappings between the plurality of logical addresses and the respective physical addresses of the non-volatile memory cells; updating the change-log of entries to mappings between the plurality of second logical addresses and respective physical addresses of the non-volatile memory cells based at least in part on receiving the second plurality of write commands; and updating, at the buffer, the mappings between the plurality of second logical addresses and the respective physical addresses of the non-volatile memory cells based at least in part on the quantity of entries of the change-log satisfying the first threshold value for a second time, where the entries transmitted from the change-log to the non-volatile memory cells includes the mappings between the plurality of second logical addresses and the respective physical addresses of the non-volatile memory cells.

Aspect 9: The method, apparatus, or non-transitory computer-readable medium of any of aspects 1 through 8, further including operations, features, circuitry, logic, means, or instructions, or any combination thereof for writing the plurality of data to the respective physical addresses of the non-volatile memory cells based at least in part on receiving the plurality of write commands, where updating the change-log of changes to the mappings between the plurality of logical addresses and the respective physical addresses of the non-volatile memory cells is based at least in part on writing the plurality of data to the respective physical addresses of the non-volatile memory cells.

Aspect 10: The method, apparatus, or non-transitory computer-readable medium of any of aspects 1 through 9, where the buffer includes a mapping merge buffer.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving a plurality of write commands for a plurality of data and a plurality of logical addresses associated with a memory system comprising non-volatile memory cells;
allocate, for a duration, a first plurality of volatile memory cells for use by a buffer based at least in part on determining that the plurality of write commands comprise random write commands;
updating, at the buffer of the memory system, a change-log of entries that include changes to mappings, of an address mapping table, between the plurality of logical addresses and respective physical addresses of the non-volatile memory cells based at least in part on receiving the plurality of write commands;
updating, at the buffer of the memory system, the mappings between the plurality of logical addresses and the respective physical addresses of the non-volatile memory cells based at least in part on a quantity of the entries of the change-log satisfying a first threshold value; and
transferring the entries of the change-log from the buffer to the non-volatile memory cells based at least in part on the quantity of the entries of the change-log satisfying the first threshold value.

2. An apparatus, comprising:
a controller associated with a memory system comprising non-volatile memory cells and a buffer, wherein the controller is configured to cause the apparatus to:
receive a plurality of write commands for a plurality of data and a plurality of logical addresses associated with the memory system;
allocate, for a duration, a first plurality of volatile memory cells for use by the buffer based at least in part on determining that the plurality of write commands comprise random write commands;
update, at the buffer, a change-log of entries that include changes to mappings, of an address mapping table, between the plurality of logical addresses and respective physical addresses of the non-volatile memory cells based at least in part on receiving the plurality of write commands;
update, at the buffer, the mappings between the plurality of logical addresses and the respective physical addresses of the non-volatile memory cells based at least in part on a quantity of the entries of the change-log satisfying a first threshold value; and
transfer the entries of the change-log from the buffer to the non-volatile memory cells based at least in part on the quantity of the entries of the change-log satisfying the first threshold value.

3. The apparatus of claim 1, wherein:
the buffer comprises a second plurality of volatile memory cells independent from the first plurality of volatile memory cells; and
transferring the entries of the change-log to the non-volatile memory cells occurs during the duration.

4. The apparatus of claim 1, wherein the controller is further configured to cause the apparatus to:
allocate, after the duration, the first plurality of volatile memory cells for use by a component of the memory system other than the buffer.

5. The apparatus of claim 2, wherein the controller is further configured to cause the apparatus to:
transfer information stored in the buffer to the non-volatile memory cells based at least in part on a quantity of data written to the non-volatile memory cells satisfying a second threshold value.

6. The apparatus of claim 5, wherein the controller is further configured to cause the apparatus to:
determine that the quantity of data written to the non-volatile memory cells satisfies the second threshold value based at least in part on updating the mappings, wherein transferring the information stored in the buffer to the non-volatile memory cells is based at least in part on determining that the quantity of data written to the non-volatile memory cells satisfies the second threshold value.

7. The apparatus of claim 2, wherein the controller is further configured to cause the apparatus to:
determine that the quantity of the entries in the change-log satisfies the first threshold value based at least in part on updating the change-log, wherein updating the mappings between the plurality of logical addresses and the respective physical addresses at the buffer and transferring the entries of the change-log to the non-volatile memory cells is based at least in part on determining that the quantity of the entries in the change-log satisfies the first threshold value.

8. The apparatus of claim 2, wherein the controller is further configured to cause the apparatus to:
receive a second plurality of write commands for a second plurality of data and a second plurality of logical addresses based at least in part on updating the mappings between the plurality of logical addresses and the respective physical addresses of the non-volatile memory cells;
update the change-log of entries to mappings between the second plurality of logical addresses and respective physical addresses of the non-volatile memory cells based at least in part on receiving the second plurality of write commands; and
update, at the buffer, the mappings between the second plurality of logical addresses and the respective physical addresses of the non-volatile memory cells based at least in part on the quantity of the entries of the change-log satisfying the first threshold value for a second time, wherein the entries transmitted from the change-log to the non-volatile memory cells includes the mappings between the second plurality of logical addresses and the respective physical addresses of the non-volatile memory cells.

9. The apparatus of claim 2, wherein the controller is further configured to cause the apparatus to:
write the plurality of data to the respective physical addresses of the non-volatile memory cells based at least in part on receiving the plurality of write commands, wherein updating the change-log of changes to the mappings between the plurality of logical addresses and the respective physical addresses of the non-volatile memory cells is based at least in part on writing the plurality of data to the respective physical addresses of the non-volatile memory cells.

10. The apparatus of claim 2, wherein the buffer comprises a mapping merge buffer.

11. A non-transitory computer-readable medium storing code comprising instructions which, when executed by a processor of an electronic device, cause the electronic device to:
receive a plurality of write commands a plurality of data and a plurality of logical addresses associated with a memory system comprising non-volatile memory cells;
allocate, for a duration, a first plurality of volatile memory cells for use by a buffer based at least in part on determining that the plurality of write commands comprise random write commands;
update, at the buffer of the memory system, a change-log of entries that include changes to mappings, of an address mapping table, between the plurality of logical addresses and respective physical addresses of the non-volatile memory cells based at least in part on receiving the plurality of write commands;
update, at the buffer of the memory system, the mappings between the plurality of logical addresses and the respective physical addresses of the non-volatile memory cells based at least in part on a quantity of the entries of the change-log satisfying a first threshold value; and
transfer the entries of the change-log from the buffer to the non-volatile memory cells based at least in part on the quantity of the entries of the change-log satisfying the first threshold value.

12. The non-transitory computer-readable medium of claim 11, wherein:
the buffer comprises a second plurality of volatile memory cells independent from the first plurality of volatile memory cells; and
transferring the entries of the change-log to the non-volatile memory cells occurs during the duration.

13. The non-transitory computer-readable medium of claim 11, wherein the instructions, when executed by the processor of the electronic device, further cause the electronic device to:
allocate, after the duration, the first plurality of volatile memory cells for use by a component of the memory system other than the buffer.

14. The non-transitory computer-readable medium of claim 11, wherein the instructions, when executed by the processor of the electronic device, further cause the electronic device to:
transfer information stored in the buffer to the non-volatile memory cells based at least in part on a quantity of data written to the non-volatile memory cells satisfying a second threshold value.

15. The non-transitory computer-readable medium of claim 14, wherein the instructions, when executed by the processor of the electronic device, further cause the electronic device to:
determine that the quantity of data written to the non-volatile memory cells satisfies the second threshold value based at least in part on updating the mappings, wherein transferring the information stored in the buffer to the non-volatile memory cells is based at least in part on determining that the quantity of data written to the non-volatile memory cells satisfies the second threshold value.

16. The non-transitory computer-readable medium of claim 11, wherein the instructions, when executed by the processor of the electronic device, further cause the electronic device to:
determine that the quantity of the entries in the change-log satisfies the first threshold value based at least in part on updating the change-log, wherein updating the mappings between the plurality of logical addresses and the respective physical addresses at the buffer and transferring the entries of the change-log to the non-volatile memory cells is based at least in part on determining that the quantity of the entries in the change-log satisfies the first threshold value.

17. The non-transitory computer-readable medium of claim 11, wherein the instructions, when executed by the processor of the electronic device, further cause the electronic device to:
receive a second plurality of write commands for a second plurality of data and a second plurality of logical addresses based at least in part on updating the mappings between the plurality of logical addresses and the respective physical addresses of the non-volatile memory cells;
update the change-log of entries to mappings between the second plurality of logical addresses and respective physical addresses of the non-volatile memory cells based at least in part on receiving the second plurality of write commands; and
update, at the buffer, the mappings between the second plurality of logical addresses and the respective physical addresses of the non-volatile memory cells based at least in part on the quantity of the entries of the change-log satisfying the first threshold value for a second time, wherein the entries transmitted from the change-log to the non-volatile memory cells includes the mappings between the second plurality of logical addresses and the respective physical addresses of the non-volatile memory cells.

18. The non-transitory computer-readable medium of claim 11, wherein the instructions, when executed by the processor of the electronic device, further cause the electronic device to:

write the plurality of data to the respective physical addresses of the non-volatile memory cells based at least in part on receiving the plurality of write commands, wherein updating the change-log of changes to the mappings between the plurality of logical addresses and the respective physical addresses of the non-volatile memory cells is based at least in part on writing the plurality of data to the respective physical addresses of the non-volatile memory cells.

* * * * *